Figure 3B:
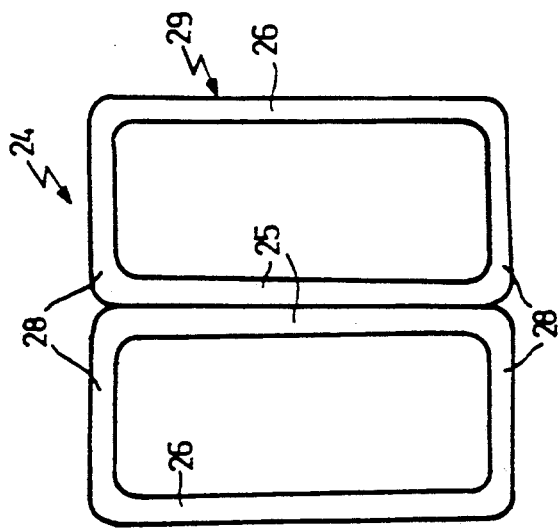

United States Patent [19]

Laukien

[11] Patent Number: 5,249,990
[45] Date of Patent: Oct. 5, 1993

[54] METHOD AND APPARATUS FOR THE PROPULSION OF WATER VEHICLES

[76] Inventor: Günther Laukien, Silberstreifen, 7512 Rheinstetten-Forchheim, Fed. Rep. of Germany

[21] Appl. No.: 663,924
[22] PCT Filed: Jul. 24, 1990
[86] PCT No.: PCT/DE90/00558
 § 371 Date: Mar. 26, 1991
 § 102(e) Date: Mar. 26, 1991
[87] PCT Pub. No.: WO91/01915
 PCT Pub. Date: Feb. 21, 1991

[30] Foreign Application Priority Data

Jul. 28, 1989 [DE] Fed. Rep. of Germany ....... 3924996

[51] Int. Cl.$^5$ ............................................. B60L 11/02
[52] U.S. Cl. ......................................... 440/6; 60/202
[58] Field of Search ................. 440/6, 38, 113; 60/202

[56] References Cited

U.S. PATENT DOCUMENTS 3,662,554 5/1972 de Broqueville ..................... 60/202

FOREIGN PATENT DOCUMENTS

| 888515 | 6/1951 | Fed. Rep. of Germany . |
| 494672 | 7/1968 | Fed. Rep. of Germany . |
| 2052605 | 10/1970 | Fed. Rep. of Germany . |
| 3518883 | 5/1985 | Fed. Rep. of Germany . |
| 804621 | 8/1955 | United Kingdom . |
| 1238803 | 5/1969 | United Kingdom . |
| 2115616 | 2/1983 | United Kingdom . |

OTHER PUBLICATIONS

British Journal "Maritime Defense", The Journal of International Navel Technology, Dec. 1988, p. 445.
German text book of Becker/Sauter "Theorie der Elektrizität" 19th edition, 1969, vol. 1, pp. 255–266.
German text book of Pohl "Einführung in die Physik", 20th edition, 1967, vol. 2, Elektrizitätslehre, pp. 98–104.
Book of Wilson, M. N., "Superconducting Magnets", Clarendon Press, 1983, pp. 53–55.
Contribution from Komarek P. in a conference report "Seminar Supraleitungstechnik", of 13/14 May 1985 in the Schule für Kerntechnik, Kernforschungszentrum Karlsruhe, pp. 180, 199–209.
British journal "The Motorship", Oct. 88, p. 74.
German text book of Moeller/Fricke/Frohne/Vaske "Grundlagen der Elektrotechnik", B. G. Teubner, Stuttgart 1986, p. 164.
German text book of Linder/Brauer/Lehmann "Taschenbuch der Elektrotechnik und Elektronik", Frankfurt/Main 1985, p. 60.
German journal "Hansa", No. 9/10, 1989, pp. 681–684.

*Primary Examiner*—Jesus D. Sotelo
*Attorney, Agent, or Firm*—Claude A. S. Hamrick

[57] ABSTRACT

A method and an apparatus for propelling water vehicles in surrounding water are disclosed. The water has carriers of electrical charge. For propelling the water vehicle, the latter is provided with an elongate pipe being immersed in the water for allowing the water to flow therethrough along a longitudinal axis thereof. An electric field (E) is generated within the pipe with electric field lines extending radially with respect to the longitudinal axis. Further, a magnetic field is also generated within the pipe, the magnetic field having field lines extending circumferentially about the longitudinal axis. Thereby, a force (F) is exerted upon the charge carriers by simultaneous action of the electric field (E) and the magnetic field (B) on the charge carriers. The force (F) is directed parallel to the longitudinal axis to thereby propel the water vehicle.

29 Claims, 5 Drawing Sheets

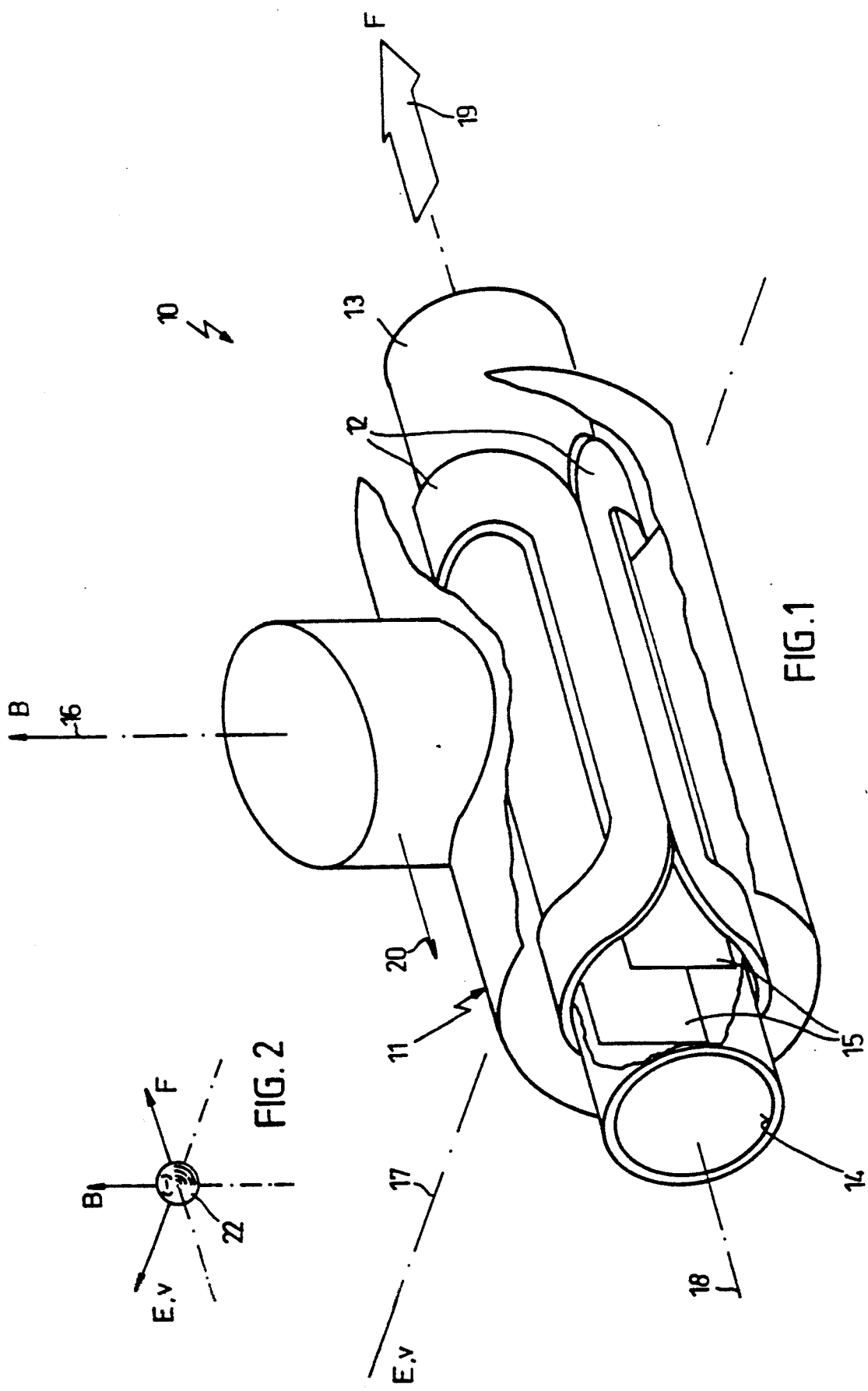

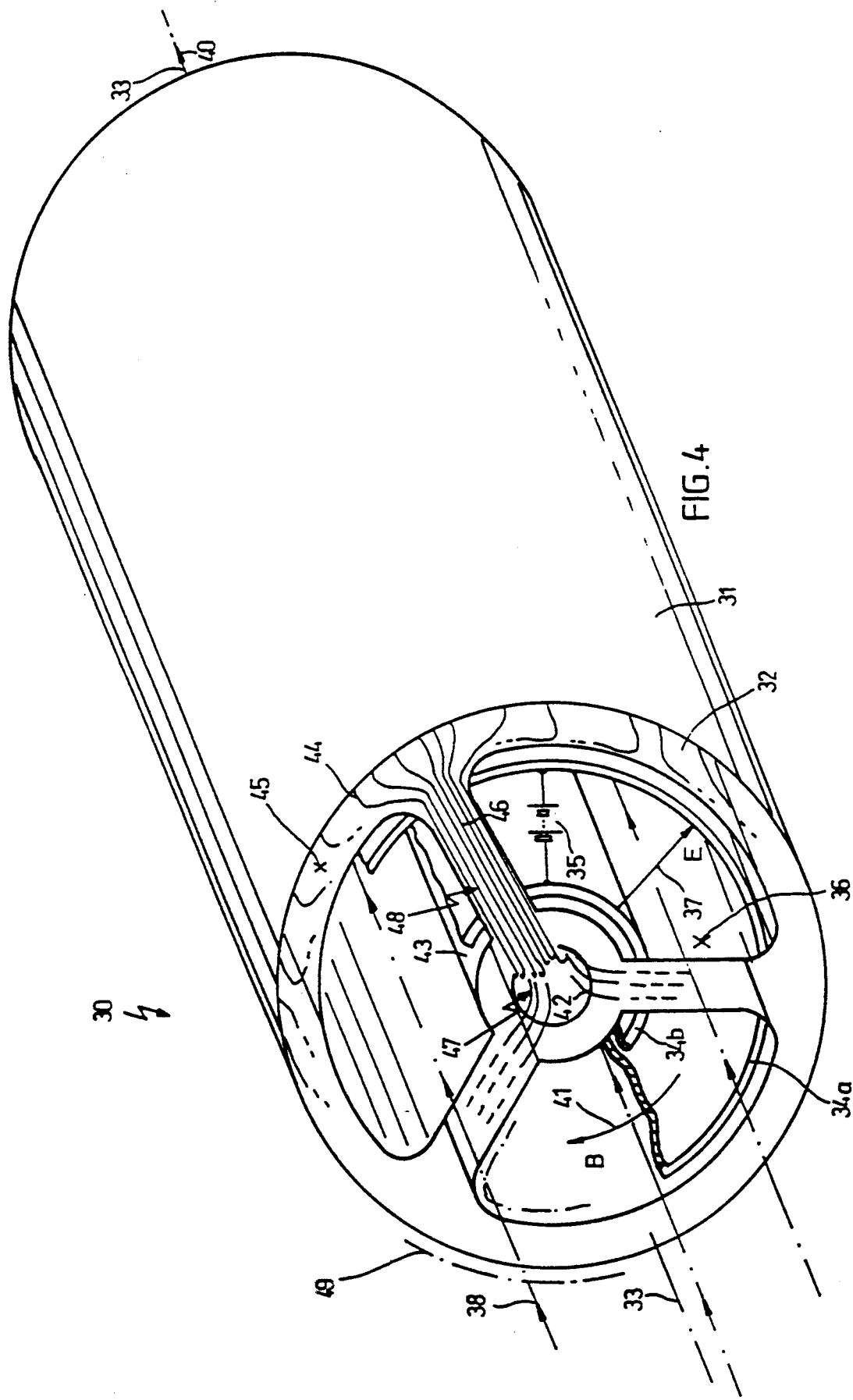

METHOD AND APPARATUS FOR THE PROPULSION OF WATER VEHICLES

The invention concerns a method for the propulsion of water vehicles with which, within a pipe shaped region through which surrounding water is streaming, a magnetic field as well as an electric field are produced with overlapping largely perpendicular field lines in such a way that a force is exercised on the charge carriers located in the surrounding water and this force is utilized as a propulsion force for the water vehicle, whereby, in the pipe shaped region, a radially directed electric field as well as a thereto perpendicularly directed magnetic field are produced.

The invention further concerns an apparatus for the propulsion of water vehicles in which a pipe shaped region through which surrounding water is streaming is equipped with a magnetic coil and in the pipe shaped region two electrodes connected to a voltage source are arranged in such a way that, within the pipe, at least one electrode, surrounded by a magnetic coil and connected to a voltage source, is arranged in such a way that a force is exercised on the charge carriers located in the surrounding water and this force is utilized as a propulsion force for the water vehicle.

A method and an apparatus of the above mentioned kind are known in the art from the British Journal "Maritime Defense, The Journal of International Naval Technology", 12/1988, page 445.

The superposition of an electric as well as a magnetic field upon a medium which contains mobile charge carriers is known in the art of so-called magnetic hydrodynamic propulsion. In consequence of the action of the electric field, the charge carriers begin to move and in consequence of the motion of the charge carriers within the magnetic field the so-called Lorentz force is exercised upon the charge carriers which, as is known in the art, is given by the cross product of the magnetic field and velocity vectors.

As mentioned above, the utilization of this type of magnetic hydrodynamic propulsion with water vehicles is also known in the art. In the above mentioned configuration which is known in the art, the pipe is surrounded by two superconducting saddle coils symmetrically arranged with respect to the pipe axis. The saddle coils produce, in this way, a magnetic field the direction of which runs perpendicular to the pipe axis. In the pipe, two condensor-like plate electrodes are arranged in the axial direction so that the magnetic field produced by these plate electrodes is likewise perpendicular to the axis direction as well as perpendicular to the direction of the magnetic field. This has the consequence that the freely moving charge carriers of the surrounding water located in the pipe, namely the ions of salt water, are given a Lorentz force along the axial direction of the pipe. The configuration which is known in the art produces, in this manner, a recoil force which stems from the axially moving charge carriers within the pipe. In the apparatus which is known in the art for the propulsion of a water vehicle, a magnetic field strength of 2 T is produced with the saddle coils using a current of 2000 A which is intended to lead to a recoil force of 8 kN.

The underlying physical principles necessary to understand this type of magnetic hydrodynamic propulsion are described in a text book of Becker/Sauter "Theorie der Elektrizität", 19th edition, 1969, Volume 1, pages 255 through 266, as well as in the text book of Pohl "Einführung in die Physik", 20th edition, 1967, Volume 2, "Elektrizitätslehre", pages 98 through 104.

The method and apparatus which are known in the art have the advantage that the propulsion unit does not in any way require moving elements and therefore practically no propulsion noise occurs. For this reason this type of configuration is well suited for military purposes as well, in particular, for the propulsion of submarines.

However, the method and the apparatus known in the art has the associated disadvantage that the operating efficiency is relatively low and the coil construction relatively complicated. Furthermore, the configuration which is known in the art has the disadvantage that, in consequence of the saddle coils which are used, a very large stray field occurs, so that vehicles which are equipped with the propulsion configuration known in the art can be easily located using magnetic detection methods. Furthermore, equipment located on board of the water vehicle, in particular, electronic equipment can experience interference due to the stray field of the magnet coil. The mechanical load on the saddle coils during operation associated with the magnetic forces upon the current carrying conductors leads to tensile stresses and in particular, in contrast to a solenoid coil, to bending stresses on the conductor. In this connection, when the limits of the conducting material which is used are reached then this can effectively limit the maximum current which can be used and therefore the maximum achievable magnetic field strength.

In the international application PCT/DE 90/00379 of 23.05.1990 (corresponding to U.S. application Ser. No. 646,613 filed Jan. 23, 1991) by the same applicant which has an older priority, however is not prepublished, within a pipe, an axially directed magnetic field as well as, between the axis of the pipe and the pipe, a radially directed electric field are produced, and a rigid screw-shaped element is located within the pipe. The surrounding water which is circulating about the axis in the pipe is, in this manner, deflected in an axial direction. Hereby, the magnetic coil is configured as a solenoid coil and is arranged larger coaxially to the pipe. The electrode is largely arranged along the pipe axis and in combination with same, serves as opposing electrode as well as pipe jacket.

In this manner an increased efficiency can be achieved in that the usable magnetic field volume of a solenoid coil is much larger than that of a saddle coil. For the same reason the magnetic stray field is also smaller. The mechanical limit in this configuration which is known in the art is the allowable tensile stress of the conducting material so that, if the occasion arises, additional support measures such as the utilization of packed conductors or the binding of the windings are necessary.

Also in the configuration described above, moving propulsion elements are by no means present. However, the current flow path is no longer linear and the streaming water which is deflected by the rigid deflecting elements leads to eddy currents which, at certain velocities, can contain characteristic frequency components.

The contents disclosed in the above mentioned. International Application PCT/DE 90/00379 (U.S. application Ser. No. 646,613) are, through this reference, incorporated into the contents disclosed in the present application.

In contrast, the underlying purpose of the invention is to improve a method and an apparatus of the above mentioned kind in such a way that, with increased operating efficiency, the stray field which is present is nearly fully shielded and that, in order to avoid noise development, the streaming surrounding water is not significantly deflected from the drive direction.

This purpose is achieved in accordance with the above mentioned method in that the magnetic field is produced with closed field lines about the axis In accordance With the above mentioned apparatus, the underlying purpose of the invention is achieved in that the magnet coil is configured as a toroidal coil and is arranged largely coaxially to the pipe and that the electrodes are arranged in the surrounding space about the magnet coil windings.

The underlying purpose of the invention is, in this manner, fully achieved.

In a toroidal coil the conductors positioned near the axis produce a magnetic field in the surrounding space the field lines of which run in a circular manner around the axis if then a radially directed electric field is additionally produced, the electric field and the magnetic field are perpendicular to each other. Thereby an axially directed force is exercised upon moving charge carriers in the surrounding water. The surrounding water is therefore accelerated in the axial direction. In the ideal case there are no radial components to the acceleration. Thereby, the propulsion is extremely noise-free and the magnetic field is ideally shielded in the outer direction since a toroidal coil, in consequence of the closing of the magnetic field lines in the inner part of the coil has, ideally, no outer field. In any event the magnetic dipole moment vanishes Altogether, it is therefore possible by means of the invention to create propulsion units which have a much simpler and compact construction and with which the utilized energy is transformed in a largely advantageous fashion into propulsion power for the water vehicle.

For this reason the method according to the invention as well as the apparatus according to the invention are particularly well suited for the propulsion of submarines, be it for the production of a forward propulsion for a cruise or crawl drive (Schleichfahrt), be it for the production of propulsion power for maneuvering in the depth direction.

In a particularly preferred embodiment of the method according to the invention, the electric field is produced with field lines whose direction largely cuts across the axis.

This measure has the advantage that the electric field throughout practically the entire inner region within the windings of the toroidal coil is perpendicularly directed with respect to the magnetic field so that the moving charge carriers of the surrounding water experience, at all positions within the inner region, a purely axial acceleration.

In a preferred embodiment of the apparatus according to the invention, the region surrounded by the windings of the toroidal coil exhibits a largely rectangular axial section.

This measure has the advantage that a relatively simple shape occurs with which the electrodes, in a correspondingly simple fashion, can also be realized.

In another variation of the apparatus according to the invention the region surrounded by the windings of the toroidal coil exhibits, however, largely a D-shaped axial section.

This measure has the advantage that the bending moments occuring in large toroidal coils with high field strengths can be reduced in that the D shape of the axial section is optimized with respect to the bending loads which occur.

In embodiments of the invention, the toroidal coil conductors which are near the axis are a dense conductor-bundle running along the axis.

This measure has the advantage that a compact construction can be achieved since, within the framework of the present invention, the region enclosed by the windings of the toroidal coil is largely utilized so that a residual reutilized axial space between the conductors positioned near the axis must remain.

In further embodiments of the invention the conductors located far from the axis of the toroidal coil are arranged to be distributed over a largely hollow and, with respect to the axis, coaxial volume and form a largely closed jacket This measure has the advantage that the shielding of the toroidal coil is perfect since the magnetic field cannot penetrate through the closed jacket.

In other embodiments of the invention, however, the toroidal coil conductors which are positioned far from the axis are conjoined into at least two conductor bundles which are arranged to be distributed rotationally symmetrically through a hollow cylindrical and, with respect to the axis, coaxial volume.

This measure has the advantage that the construction and assembly of the toroidal coil is simplified since the toroidal coil can be composed from many radially directed coil slices distributed about a circumference. In the simplest case it is, in fact, possible to produce a toroidal coil from two rectangular coils which are arranged with their inner lengthwise conductors next to each other at the axis and displaced with respect to each other by 180 degrees. In this case, the coil volume is extremely small and therefore can, in a particularly simple fashion, be surrounded by further units, by way of example, by a cryostat of the kind used in superconducting magnet systems.

In embodiments of the invention the conductors positioned close to the axis are connected to the conductors positioned far from the axis via radially running conductor bundles.

This measure has the advantage that sufficient open space remains at the front sides of the toroidal coil in order to provide a cross sectional profile for the through-streaming surrounding water. Emphasis on radially directed conductor bundles also has the advantage that the conductor bundles can be dressed with hydrodynamically advantageous profiles in order to reduce the current flow resistance of the coils. The radially running conductor bundles are, thereby, arranged to be preferentially rotationally symmetric with respect to the axis, preferentially two, three or four of this type of conductor bundles are arranged displaced with respect to each other by 180 degrees, 120 degrees or 90 degrees respectively.

In particularly preferred embodiments of the invention the windings of the toroidal coil are, at least partially, connected in series. It is, however, also possible to supply the radially running conductor bundles separately with current depending on what is useful given the specific case at hand.

In further embodiments of the invention the electrodes are configured as cylindrical pipes which are arranged coaxially with respect to the axis with radial intermediate space.

This measure has the advantage that a rotationally symmetric electric field can be produced in the inner region of the coil so that the force acting on the mobile charge carrier is also rotationally symmetric. Furthermore, the utilization of a cylindrical pipe has the advantage that a proper guiding of the surrounding water is also possible since cylindrical pipes have a particularly low hydrodynamic resistance. Clearly, however, instead of complete cylindrical pipes, segments of cylindrical pipes can also be used without departing from the framework of the present invention.

In a particularly preferred embodiment of the apparatus according to the invention, the voltage source is adjustable with respect to its output voltage and polarity.

This measure has the advantage that the forward propulsion force and direction can be adjusted at will so that the water vehicle can be adjusted with respect to its drive speed and direction in an extremely simple manner.

As in prior art, it is particularly preferred in accordance with the invention when a superconducting coil is utilized as magnet coil since in consequence of the natural ion concentration in salt water, high field strengths are necessary in order to produce the necessary forward propulsion force needed to propel an actual water vehicle.

Hereby, it is particularly preferred if the coil is composed of a high temperature superconductor.

This measure has the advantage that, depending on the transition temperature of the superconductor, only relatively simple cooling devices or, in fact, no cooling devices whatsoever are necessary if a superconducting material is utilized as the coil winding which is already in a superconducting state at the surrounding temperature of the water vehicle. It is particularly preferred if the coil can be operated in a superconducting short circuit, as a result of which, exacting requirements and efforts for magnetic field production can be avoided.

The conductors of the conducting bundle positioned close to axis are, preferentially, so arranged that, on their surface, the critical field strength of the superconducting material is in no event exceeded which, in turn, specifies the average allowable current density of the conducting bundle and thereby its minimal radius.

With superconducting coils, the conducting bundles must be completely surrounded by cryostructures. This is also the case for the radial conducting sections on the front sides of the coil. Towards this end, in embodiments of the invention, a pipe-shaped cryostat can be utilized which includes an inner pipe for the conductor positioned close to the axis as "hub" and, on the front sides of the coil, radial "spokes" for the radial conducting bundles and, finally, a "jacket" for the conductors positioned far from the axis.

In a preferred embodiment of the invention the "spokes" are likewise surrounded by at least one electrode pair whereby, through application of a voltage whose polarity can, preferentially, be changed, a force is exercised upon the charge carriers of the surrounding water which is approximately parallel to the direction of the "spoke".

In this manner an additional sideward and/or vertical maneuverability is established which is particularly advantageous for submarines. The tilt of the boat can also be influenced. It is not necessary for the electrode pair to completely enclose the "spokes" rather their precise geometer is also shaped by technical current flow requirements.

In this case, as already mentioned, the "spokes" can, in place of the "jacket", extend along the entire axial length in order to accept the conductors located at a distance from the axis or can be confined to the region of the front sides of the coil. The electrodes for the production of the electric field can either directly lie on or constitute the "hub" or the inner side of the "jacket" respectively. The surrounding water streams between the "spokes" in an axial direction whereby the cross section of the current channel can be hydrodynamically formed in order to optimize the current flow relationships and the degree of operating efficiency. A plurality of independent cryostats can also be utilized in order to accommodate individual coil bundles consisting of portions of the conductors located near the axis, the conductors located far from the axis, and the radial conductors in individual cryostats.

There are a multitude of conceivable variations in accordance with the invention in order to arrange, in accordance with the invention, apparatuses in or on the hull of a surface or underwater vehicle.

Accordingly, in a first variation, the integration of the propulsion unit in a ship's hull is provided for, whereas, alternatively, it is also possible to arrange the propulsion unit on an extension at a distance from a ship's hull or to integrate it into a keel of a ship's hull depending on what is reasonable in individual cases while taking into consideration the intended application of the water vehicle.

If the propulsion unit, in accordance with a further embodiment of the invention, is arranged to be inclined with respect to the drive direction of a ship's hull, preferentially, swivelable, then, in the case of an underwater vehicle, a maneuver to raise or to lower the diving depth can be effected whereas with a surface vehicle through raising (levitation) of the ship's hull, the hydrodynamic resistance can be reduced as is also known in the art of hydrofoil ships.

It is particularly preferred when two propulsion units, built from toroidal coil and pipe, are arranged parallel and next to each other upon a common support structure. In such a tandem configuration, the propulsion units can be adjusted in various ways, by way of example, in that one adjusts the voltage amplitude and/or polarity differently. In this manner, a maneuvering is possible when the propulsion forces of the two individual propulsion units differ in either magnitude and/or direction.

In further preferred embodiments of the invention an ionization unit is connected to the pipe, by way of example, a substance is added to the surrounding water in order to increase its conductivity This measure has the advantage that, by increasing the ion concentration, the propulsion force is also increased. Clearly, the ionization unit, in this case, can be switched in for only temporary periods of time in order, by way of example in the case of a military vehicle, to increase the propulsion power for short periods of time during attack or retreat.

Furthermore, embodiments of the invention are additionally preferred in which the force exercised on the charge carriers is adjustable as a function of the radial distance from the electrodes, by way of example, in that the dependence of the electric field strength as a function of radial distance from the electrodes is varied.

This measure has the advantage that in the cylindrical condensor arrangement in accordance with the invention, the natural dependence of the field strength on radius can be counteracted such that turbulences and cavitations in consequence of differentially acting Lorentz forces can be avoided.

In a further particularly preferred group of embodiments of the invention, the pipe has an enlarged cross section in the current streaming direction of the water.

This measure has the advantage that, for constant throughput, the current flow velocity at the output of the pipe can be reduced so that, in this manner, turbulences at the output of the pipe can be likewise largely avoided.

It is particularly preferred in this embodiment if the pipe is equipped with side intake openings.

This measure has, namely, the advantage that the force or acceleration distributed upon the water molecules over the axial length of the pipe is distributed upon "fresh" water so that a particularly even distribution of the forces acting on the water molecules over the axis is achieved.

Further advantages can be derived from the description and the accompanying drawing.

Clearly the characteristic features mentioned above and to be explained below are applicable not only in the corresponding combination given but also in other combinations or by themselves without departing from the framework of the present invention.

Figure 3C:
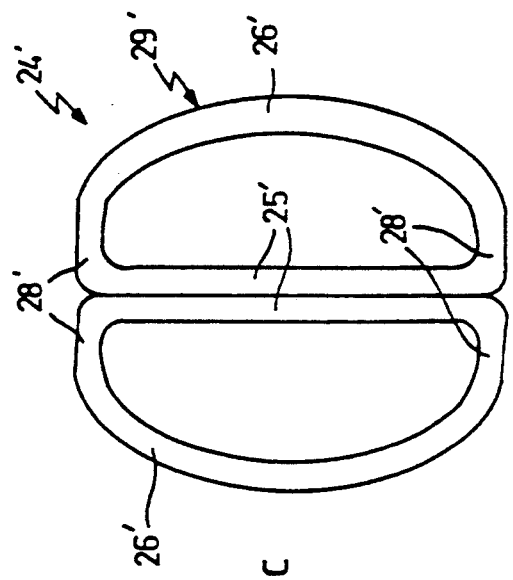
Figure 3A:
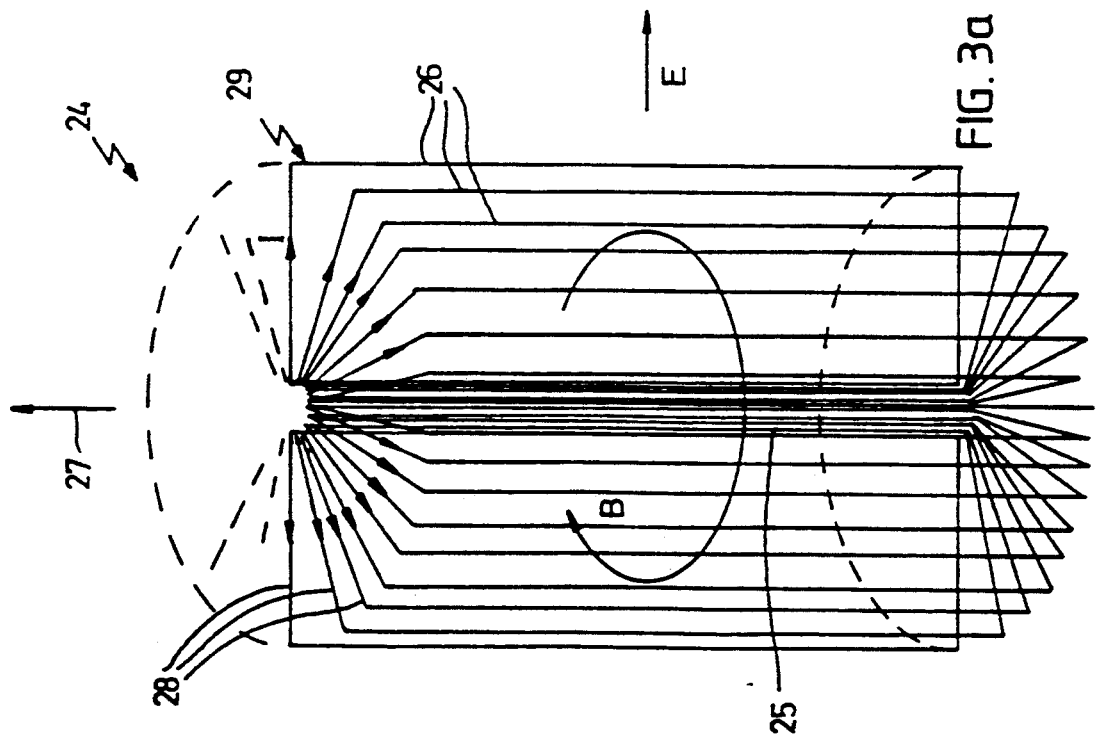
Figure 5:
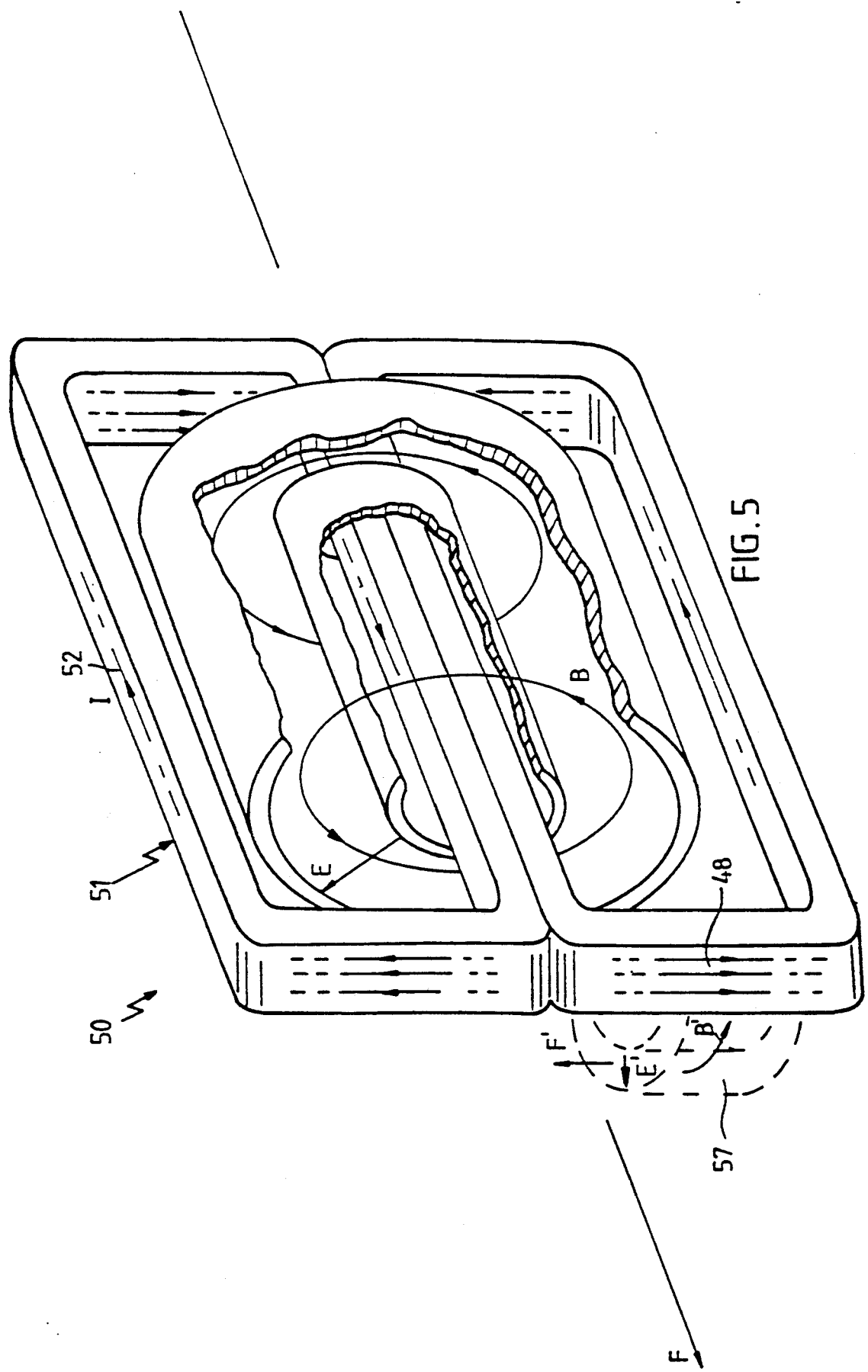
Figure 10:
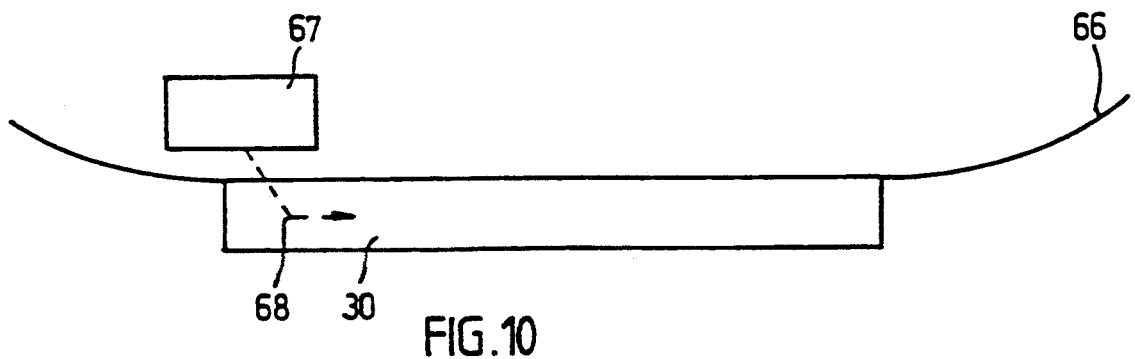

Embodiments of the invention are represented in the drawing and will be further explained in the following description. Shown are:

FIG. 1 a perspective representation of a magnetic hydrodynamic propulsion unit for water vehicles according to prior art;

FIG. 2 a schematic representation for the explanation of the Lorentz forces associated with the configuration in accordance with FIG. 1;

FIG. 3a an extremely schematic perspective view of a toroidal coil;

FIG. 3b an axial cut through the toroidal coil represented in FIG. 3a;

FIG. 3c a representation similar to FIG. 3b however for another configuration of the toroidal coil;

FIG. 4 a perspective view of a first embodiment of a propulsion unit in accordance with the invention;

FIG. 5 a perspective view of a second embodiment of a propulsion unit in accordance with the invention;

FIG. 6 through 10 schematic representations for the explanation of possibilities for arranging propulsion units in accordance with the invention on or in ships' hulls;

In FIG. 1 10 labels, in its entirety, a magnetic hydrodynamic propulsion unit for a water vehicle according to prior art.

The propulsion unit 10 includes a cryostat in which a pair of superconducting saddle coils 12 is arranged. The saddle coils 12 are arranged on both sides of a pipe 13 the through opening 14 of which is at room temperature and through which surrounding water, namely sea salt water, is streaming.

Two plate electrodes 15 are located in the through opening 14 which extend in an axial direction of the pipe 13 and exhibit a certain separation from each other. The plate electrodes 15 are connected to a voltage source which is not represented in FIG. 1.

When the saddle coils 12 are excited they produce a magnetic field B the direction of which is labelled with an axis 16 in FIG. 1. The electrodes 15 produce, on the other hand, an electric field E the axis of which is labelled with 17 in FIG. 1 and which lies perpendicular to the axis 16 of the magnetic field B. Both axes 16, 17, for their part, extend perpendicularly to an axis 18 of the pipe 13.

Through examination of FIG. 2 one realizes the active mechanism of FIG. 1 as follows:

The surrounding water, namely the sea salt water, contains charge carriers 22, namely the ions of the salt water. The charge carriers 22 are also mobile in the water so that, through the action of an electric field E, the charge carriers 22 begin to move since the electric field E exercises a force upon the charge carriers 22 in a direction of the electric field E. The charge carriers 22 thereby take on a velocity v whose vector is directed in the direction of the electric field strength E.

Since, on the other hand, a magnetic field B is acting on the charge carriers 22 which is perpendicular to the electric field E, the so-called Lorentz force F is, furthermore, exercised upon the charge carriers 22 which corresponds to the cross product of the velocity and magnetic field B vectors and, thereby, for its part, is directed perpendicularly to the two above mentioned quantities. This means that the Lorentz force F lies in the direction of the axis 18 of the pipe 13. In consequence of the plurality of charge carriers 22 in the salt water a recoil results upon the propulsion unit 10 as is indicated by an arrow 19 in FIG. 1. Since, for its part, the propulsion unit 10 is freely moving, it begins to move, and, in fact, in a drive direction labelled with an arrow 20 in FIG. 1 which is opposite to the recoil 19 on the axis 18 of the pipe 13.

In the device of FIG. 1, which is known in the art, it is necessary to arrange a pair of saddle coils 12 on both sides of the pipe 13, and as a result a relatively complicated shaping of the coils 12 and a likewise problematic support of these coils 12 on the pipe 13 is necessary Furthermore it is clear from the representation of FIG. 1 that the configuration of the coils 12 has as a consequence, a very large stray field since the coils 12 leave open a very large window and, as a result, the field lines close in upon themselves to a large degree far outside of the propulsion unit 10. Finally, the propulsion unit 10 requires a relatively large cryostat 11 in order to accommodate the saddle coils 12 with the surrounding pipe 13. The bending moment acting upon a saddle coil 12 through which current is flowing causes a limit on the maximal allowable current, in particular, with superconducting magnets.

In FIG. 3a 24 is, in its entirety, a conventional toroidal coil which exhibits conductors 25 near an axis and conductors 26 far from an axis each being in reference to the central axis 27. The conductors 25, 26 which are close to the axis and far from the axis are each connected to each other via radial conductors 28. In this manner, the windings 29, are formed. If the toroidal coil 24 has a current 1 flowing through it a magnetic field B is formed the field lines of which loop around the conductor 25 near the axis and, thereby, the axis 27. A stray field, i. e. a magnetic field extending into the outer region, does not occur in the ideal case.

If an electric field E is produced in a radial direction, a force is thereby extorted upon the moving charge carriers in the surrounding water which is directed in the direction of the axis 27.

FIG. 3b once again shows the toroidal coil 29, however, in an axial cut and with bundled windings 29. One notices that the windings 29, in axial cut, exhibit a largely rectangular form.

In contrast, FIG. 3c shows a variation of a solenoid coil 24', with which the conductors 25' near the axis, and the conductors 26' far from the axis, and the radial conductors 28' run in, with respect to their axial section, D-shaped windings 29'.

This D-shape for the windings 29' has the following intent:

In large toroidal coils, as in large saddle coils, bending stresses occur. The exact shape of a toroidal coil can be numerically calculated in such a way that the bending stresses are small and, in the ideal case, as in the ideal long solenoid, vanish. Towards this end, a calculation method can be found, by way of example, in the book of Wilson, M.N., "Superconducting Magnets", Clarendon Press, 1983, pages 53 through 55 as well as in a contribution from Komarek P. in a conference report "Seminar Supraleitungstechnik" of 13/14 May 1985 in the "Schule fér Kerntechnik", Kernforschungszentrum Karlsruhe, beginning with page 180, in particular pages 199 through 209.

The methods indicated in these literature references named can also be applied, under appropriate modifications, to the toroidal coils of the present invention. Towards this end, it is not necessary that the bending load be made exactly equal to zero, but rather it is sufficient if the bending load is confined to within acceptable limits, said limits being given by the conducting material of the coils. Based upon these idealized solutions, largely bending load free configurations for actual coils can, on the other hand, be found by means of numerical iteration while taking into consideration the finite conductor cross sections and the actual exact distribution of the magnetic field.

FIG. 4 shows a first embodiment of a propulsion unit 30 in accordance with the invention which has largely the form of a cylindrical pipe 31.

A toroidal coil 32 is arranged about an axis 33. Electrodes 34a and 34b have the form of hollow cylinders and are connected to a voltage source 35. The electrodes 34a, 34b enclose a pipe-shaped region between themselves through which the surrounding water can stream in the direction of the axis 33.

In this manner, radially directed electrical field lines 37 are produced between the coaxially arranged electrodes 34a, 34b, the direction of which all run through the axis 33.

A current streaming direction 38 of the surrounding water establishes itself in the manner sketched in FIG. 4 and also leads to a recoil indicated with an arrow 40 since field lines 41 of the magnetic field B circle around the axis 33 as explained above in connection with FIG. 3.

Conductors 42 run near to the axis of the toroidal coil 32, preferentially, in a central pipe 43 and the conductors 44 which are far from the axis are evenly distributed over a hollow cylindrical volume 45, whereby pipe 43 and the hollow cylindrical volume 45 are coaxially arranged with respect to axis 33. The conductors 42 which are near the axis are connected to the conductors 44 far from the axis via radial conductors 46. The conductors 42 near the axis are collected in conductor bundles 47 and the radial conductors 46 are collected in conductor bundles 48.

The radial conductor bundles 48 thereby form "spokes" of a, in radial cut, wheel-like structure.

In variations of the propulsion unit 30, the pipe 43 can be directly constructed from the inner electrode 34b, likewise, the hollow cylindrical volume 45 can be radially bounded on the inside by the outer electrode 34a.

Clearly, further, the radial conductor bundles 48 in the "spokes" are shaped in a hydrodynamically advantageous manner in order to present as small a current flow resistance as possible to the streaming surrounding water in the current flow direction 38. This is all realizable within the framework of the knowledge of one of average skill in the art and therefore, for reasons of clarity, is not represented in detail in FIG. 4.

49, in FIG. 4 indicates that the toroidal coil 32 can be a superconducting coil whereby, towards this end, it is necessary to accommodate the toroidal coil 32 within a cryostructure.

alternatively, the individual coil parts associated with differing radial conductor bundles 48 can be accommodated within separate cryostructures which are then rigidly connected.

FIG. 5 shows a variation with a propulsion unit 50 with which a toroidal coil 51 consists of two rectangular-shaped coils so that the conductors 52 far from the axis are likewise collected into bundles.

The structure of the electrodes can, in the embodiment of FIG. 5, correspond to that of FIG. 4.

The electrodes can, however, also be restricted to finite angular regions around the conductor plane.

The radial conductor bundle sections 48 can, additionally, each be partially or fully surrounded by a further electrode pair 57 as represented in FIG. 5. In this manner an additional magnetic hydrodynamic propulsion option (F') can be achieved which is largely perpendicular to the main propulsion (F) thereby allowing maneuvering in the horizontal and/or vertical direction as well as a trimming of the vehicle, in particular, with submarines. The additional electrodes 57 represented in FIG. 5 can, of course, also be incorporated in all the other embodiments of the invention.

In contrast to the embodiment of FIG. 4, a larger stray field can be expected with the toroidal coil 51 of FIG. 5 since the field lines of the magnetic field B extend into the outer region, i. e. the region outside of the toroidal coil 51. However, the magnetic dipole moment vanishes, even for this simple configuration.

It is further possible With the embodiment of FIG. 5 to also accommodate both individual rectangular coils in separate cryostats in the event that a superconducting coil is utilized In FIGS. 6 through 9, various variations are represented in which individual propulsion units or tandem propulsion units can be accommodated in hulls of surface or underwater vehicles.

Figure 6:
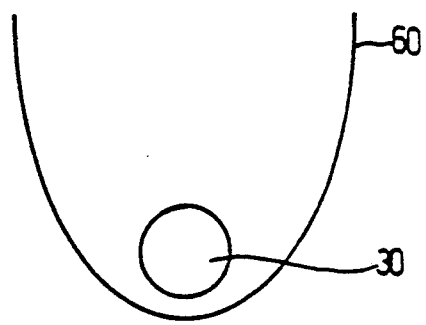

In a variation in accordance with FIG. 6, an individual propulsion unit 30 of the kind explained in FIG. 4 is integrated into a hull 60 so that a minimal current flow resistance is established.

Figure 7:
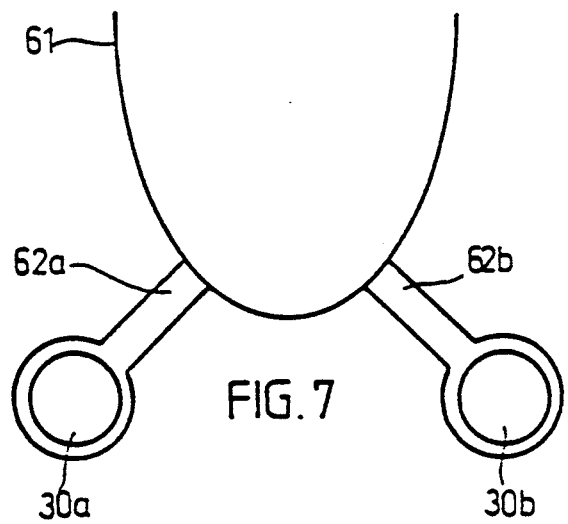

In the variation in accordance with FIG. 7, a tandem propulsion unit 30a, 30b is arranged on extensions 62a, 62b at a distance from a hull 61.

Figure 8:
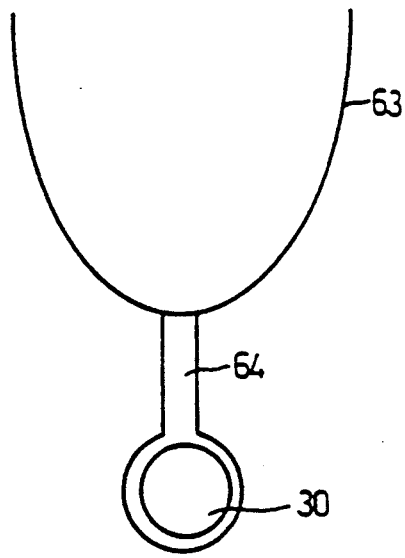

On the other hand, in the variation in accordance with FIG. 8, an individual propulsion unit 30 in accordance with FIG. 4 is located, on the other hand, on the under end of a keel 64 of a hull 63.

Figure 9:
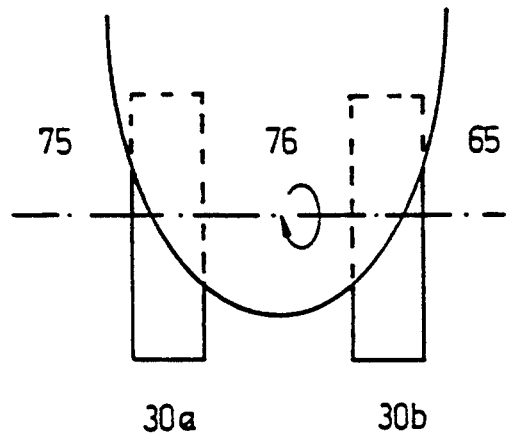

Finally, FIG. 9 also illustrates the possibility of arranging a tandem propulsion unit 30a, 30b in a hull 65 in such a way that the direction of the propulsion unit 30a, 30b does not run parallel to the drive direction, rather can be swivelled about an axis 75 which is perpendicular to the drive direction as indicated with an arrow 76.

With underwater vehicles maneuvering in the depth direction can, thereby, be achieved whereby, with surface vehicles, a levitation of the hull can be attained with the goal of reducing the hydrodynamic resistance in the manner of a hydrofoil.

Clearly, thereby, the configurations of FIG. 6 through 9 can be applied in combination with each other or with exchange of the individual elements, by way of example, in the case of FIG. 8 in that, on the under end of the keel 64, an individual propulsion unit 30 is not implemented rather, moreover, a tandem unit 30a, 30b.

FIG. 10 shows another hull 66 on the underside of which a propulsion unit 30 is arranged in accordance with FIG. 4 whereby, clearly here as well, one can also be dealing with a tandem unit.

On the front end of the propulsion unit 30 an ionization unit 67 is situated in a hull 66 said unit being connected via a conduit 68 with the inner region of the pipe of the propulsion unit 30.

The ionization unit 67 can, by way of example, be a storage unit and dispenser for a substance with which the conductivity of the sea water can be increased, by way of example, a salt or salt solution tank.

Via the conduit 68, in temporary or in constant operation, by means of the ionization unit 67, the electrical conductivity, i. e. the ion concentration, of the surrounding water which is streaming through the pipe of the propulsion unit 30 can be increased. In consequence of the increase of the ion concentration, the recoil force is also increased and thereby the drive velocity of the hull 66

It is known in the art that, with cylindrical condensors, the electrical field strength decreases radially with the inverse value of the radius in going from the electrode located at the cylinder axis outwards. This has the consequence that, together with the value of the magnetic field strength which likewise decreases in the outward direction, the Lorentz forces exercised upon the charge carriers of the surrounding water and thereby the propulsion in the axial direction both decrease with increasing radius.

Since this, in particular cases, can lead to turbulences or cavitations, means to compensate or optimize this radial dependence can be provided for. Towards this end, the radial section between the concentric electrodes can be subdivided into a plurality of cylindrical sections in that several concentric pipes can be provided for which are located at varying radial separations from the innermost electrode. If one, then, connects the various pipes to taps of a voltage source, a linearized dependence of the electrical voltage as a function of radius results whereby this dependence can be made the more linear the finer the step size between the pipes used. It is also possible to connect the connecting conductors between the pipes and the voltage source in a non-linear fashion such that the dependence can be even further optimized, by way of example, in order to achieve a constant, radially independent, acceleration.

Furthermore, it is possible with embodiments of the invention to increase the cross section of the pipe-shaped region of the toroidal coil from the water entrance through to the water exit, that is to say, to impart to said region, by way of example, the shape of a cone, a paraboloid of rotation, or a hyperbola of rotation.

Thereby, sideward intake openings can be provided for through which, in a manner of a waterjet pump, additional water can be sucked into the pipe-shaped region.

Should one, namely, utilize a continuous pipe-shaped region of constant cross section, the water streaming through along the axial length is then continually subjected to the Lorentz force so that, with a compressible medium, the exiting medium, would be accelerated with respect to the entering medium. Since, as is known in the art, water is an incompressible medium, the suction increases through the axial region of action of the Lorentz forces and, in consequence of same, eddy currents and cavitation phenomena can result. These can be counteracted by means of the sideward intake openings in that "fresh" water is sucked in sidewards and, at the same time, an increasing cross section is provided for so that, in other words, a compressible medium is simulated. In this manner, the exiting current flow velocity of the water can, in general, assume values comparable to those of the entering velocity of the water whereby, however, in consequence of the increased cross section of the pipe at the exiting end and, in consequence of the sideward intake openings, the exiting quantity of water per unit time is increased.

In a practical embodiment of the propulsion unit in accordance with the invention, the propulsion unit 30 in accordance with FIG. 4 can, by way of example, be so configured that the pipe 31 obtains a diameter of 1 m and a length of 10 m.

A coil of, by way of example, 3 to 4 T magnetic field strength can be incorporated as the toroidal coil 32 as is known in the art of nuclear physics.

I claim:

1. A method for propelling water vehicles in surrounding water, said water having carriers of electrical charge, said method comprising the steps of:
    providing said water vehicle with elongate pipe means, said pipe means being immersed in said water for allowing said water to flow therethrough along a longitudinal axis thereof;
    generating an electric field (E) within said pipe means, said electrical field (E) having electric field lines extending radially with respect to said longitudinal axis; and
    generating, further, a magnetic field (B) within said pipe means, said magnetic field (B) having magnetic field lines extending circumferentially about said longitudinal axis, thereby exerting a force (F) upon said charge carriers by simultaneous action of said electric field (E) and said magnetic field (B) on said charge carriers, said force (F) being directed parallel to said longitudinal axis to propel said water vehicle.

2. The method of claim 1, wherein said step of generating said electric field (E) comprises the steps of generating said electric field lines to intersect said longitudinal axis.

3. An apparatus for propelling water vehicles in surrounding water, said water having carriers of electrical charge, said apparatus comprising:
    elongate pipe means being immersed in said water for allowing said water to flow therethrough along a longitudinal axis thereof;
    electrode means being coupled to voltage supply means, said electrode means being arranged and shaped to generate an electric field (E) within said pipe means such that said electric field (E) has electric field lines extending radially with respect to said longitudinal axis; and toroidal magnet coil means being arranged coaxially with respect to said pipe means for generating, further, a magnetic field (B) within said pipe means, said magnetic field (B) having magnetic field lines standing circumferentially about said longitudinal axis, thereby exerting a force (F) upon said charge carriers by simultaneous action of said electric field (E) and said magnetic field (B) on said charge carriers, said force (F) being directed parallel to said longitudinal axis o propel said water vehicle.

4. The apparatus of claim 3, wherein said toroidal magnet coil means has windings encircling a rectangular space if viewed in an axial section.

5. The apparatus of claim 3, wherein said toroidal magnet coil means has windings encircling a D-shaped space if viewed in an axial section, for making said windings free of bending stress.

6. The apparatus of claim 3, wherein said toroidal magnet coil means comprises axial conductors extending close to said longitudinal axis, said axial conductors being arranged as a dense conductor bundle running along said longitudinal axis.

7. The apparatus of claim 3, wherein said toroidal magnet coil means comprises off-axis conductors extending distant from said longitudinal axis, said off-axis conductors distributed over an essentially hollow cylindrical volume being coaxial to said longitudinal axis, said hollow cylindrical volume forming an essentially closed jacket.

8. The apparatus of claim 3, wherein said toroidal magnet coil means comprises off-axis conductors extending distant from said longitudinal axis, said off-axis conductors being collected into at least two conductor bundles distributed in a rotationally symmetric manner over a hollow cylindrical space coaxial to said longitudinal axis.

9. The apparatus of claim 3, wherein said toroidal magnet coil means comprises off-axis conductors extending close to said longitudinal axis and off-axis conductors extending distant from said longitudinal axis, said axial and said off-axis conductors being connected with each other via radially extending conductor bundles.

10. The apparatus of claim 9, wherein said conductor bundles are arranged rotationally symmetrically with respect to said longitudinal axis.

11. The apparatus of claim 9, wherein said conductor bundles are separately supplied with current.

12. The apparatus of claim 9, wherein said conductor bundles are surrounded by concentric electrodes.

13. The apparatus of claim 3, wherein said toroidal magnet coil means has windings being at least partially connected in series.

14. The apparatus of claim 3, wherein said electrode means are configured as cylindrical pipes being arranged coaxially to said longitudinal axis with a radial gap therebetween.

15. The apparatus of claim 3, wherein said voltage supply means is adjustable with respect to an output voltage.

16. The apparatus of claim 3, wherein said toroidal magnet coil means is a superconducting coil.

17. The apparatus of claim 16, wherein said superconducting coil is made from a high-temperature superconductor.

18. The apparatus of claim 16, wherein said superconducting coil is operated in a persistent mode.

19. The apparatus of claim 3, wherein said pipe means, said electrode means and said toroidal magnet coil means are integrated into a hull of said water vehicle.

20. The apparatus of claim 3, wherein said pipe means, said electrode means and said toroidal magnet coil means are arranged on a terminal end of a leg extending from a hull of said water vehicle.

21. The apparatus of claim 3, wherein said pipe means, said electrode means and said toroidal magnet coil means are integrated into a keel of a hull of said water vehicle.

22. The apparatus of claim 3, wherein said pipe means, said electrode means and said toroidal magnet coil means are integrated into a propulsion unit, said propulsion unit being arranged to be swivelled with respect to a drive direction of said water vehicle.

23. The apparatus of claim 3, comprising ionization means for ionizing said surrounding water, said ionization means being connected to said pipe means.

24. The apparatus of claim 23, wherein said ionization means is designed to add a substance to said surrounding water, said substance increasing the electric conductivity of said surrounding water flowing through said pipe means.

25. The apparatus of claim 3, wherein means are provided for adjusting said force (F) exerted upon said charge carriers as a function of a radial distance from said electrode means.

26. The apparatus of claim 25, wherein said means for adjusting said force are designed to adjust the electric field strength of said electric field (E) as a function of a radial distance from said electrode means.

27. The apparatus of claim 3, wherein said pipe means has a cross-sectional area increasing in a direction along said longitudinal axis along which said surrounding water flows 28. The apparatus of claim 27, wherein said pipe means is provided with sideward intake openings.

29. The apparatus of claim 3, wherein said voltage supply means is adjustable with respect to an output polarity.

* * * * *